Jan. 1, 1952  E. E. FRANZ  2,580,668
ELASTOMER MOLD SEALING DEVICE
Filed April 16, 1949

INVENTOR
E.E.FRANZ
BY
ATTORNEY

Patented Jan. 1, 1952

2,580,668

UNITED STATES PATENT OFFICE 2,580,668

ELASTOMER MOLD SEALING DEVICE

Erwin E. Franz, Cranford, N. J., assignor to Western Electric Company, Incorporated, New York, N. Y., a corporation of New York Application April 16, 1949, Serial No. 87,952

1 Claim. (Cl. 18—36)

This invention relates to the sealing of molds, and it is an object of this invention to provide a seal which will keep casting resin within its proper enclosure.

In the process involving the joining of two or more elements of an assembly by means of a casting resin, it is essential that the resin be sealed within its casting chamber to prevent its leaking into other parts of the mold. Such leakage is highly undesirable as the casting resin finds its way in between the mold and other sections of the elements being joined, or between different parts of the mold and, on hardening, presents a troublesome problem of separation.

Applicant has devised a mold seal which effectively contains the casting resin within its proper chamber, and which prevents its leaking into other parts of the mold. In one embodiment of the invention, the device comprises two mold closing members of rigid material to fit against and close an aperture in a complementary mold member, the mold closing members being provided with and supporting sealing members of an elastomer substance which seals the aperture by being forcible thereinto with elastic deformation.

Other objects and advantages will be apparent from the following detailed description taken in conjunction with the attached drawing, in which.

Figure 1:
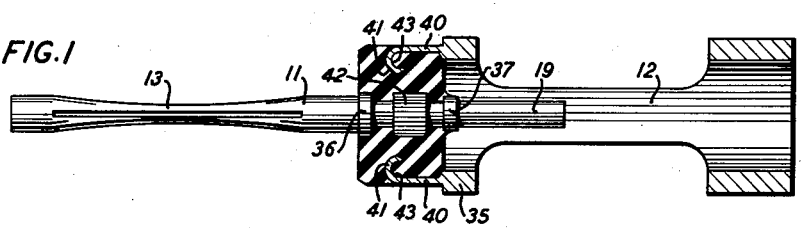
Fig. 1 is a partial sectional view showing two pieces which have been joined together by a casting resin.

With reference to the drawing, the two parts of the assembly which are to be joined by the casting resin are designated as 11 and 12. In the embodiment of the invention here illustrated, the joined assembly is used as a connection on one end of a coaxial cable to fit into a corresponding connection (not shown) of another section of coaxial cable. The second connection has a cylindrical jack which fits within the part 11 and expands the concave segments 13 slightly to form a tight electrical and mechanical connection. In assembling the two parts into spaced relationship with each other, it is essential that they be concentric, as any variation in this respect would alter the electrical characteristics of the coaxial cable.

Figure 2:
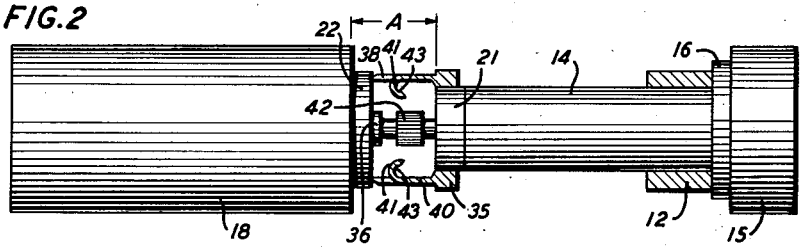
Fig. 2 shows the two pieces positioned in their respective mold members prior to joining.
Figure 3:
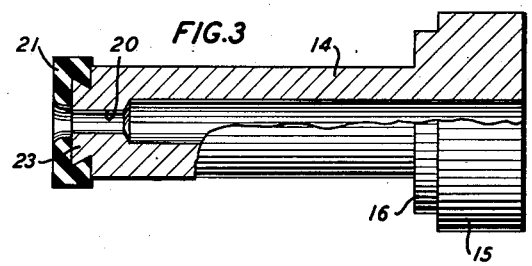
Figs. 3 and 4 are partial sectional views of the molding members corresponding to the two pieces.
Figure 4:
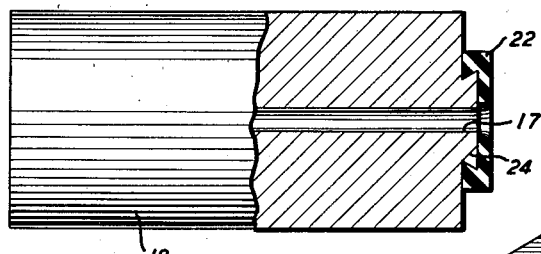
Figure 5:
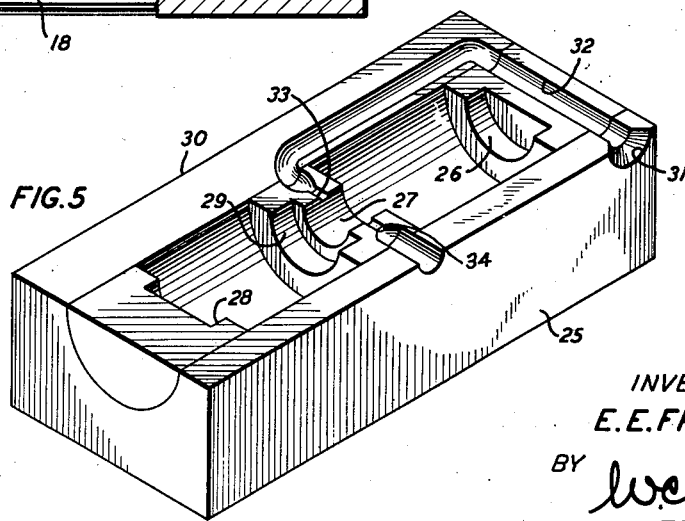
Fig. 5 is a perspective view of a complementary mold member into which is placed the assembly shown in Fig. 2.

In the molding process the part 12 is slid over the stem 14 of an auxiliary mold member 15, as shown in Fig. 2, and rests against shoulder 16. The part 11 fits primarily into a bore 17 of an auxiliary mold member 18, with its extension 19 being positioned within the bore 20 of the mold member 15.

One end of mold member 15 is provided with a seal 21, and an end of mold member 18 has a similar seal 22, the seals being mounted on shoulders 23 and 24 respectively, which are undercut to provide a better anchorage. These seals are made of an elastomer substance, such as rubber, so as to be able to be compressed elastically.

After the two assembly parts 11 and 12 have been positioned within the mold members 15 and 18, the entire mold and part assembly as shown in Fig. 2 is placed in a main mold member 25. One end of the mold member 15 is supported in a recess 26 and the other by the part 12 whose surface 40 in turn is supported by the wall of an aperture 27. One end of mold member 18 is supported by a recess 28 and the other by recess 29. The portion of the entire mold and part assembly which lies within the aperture 27 after the complete assembly has been placed in the main mold member 25 is indicated by the letter A in Fig. 2.

After the assembly to be molded has been placed in position in the main mold 25, a corresponding main mold member (not shown) is placed over the main mold 25 and the assembly, thus providing an enclosed mold and casting chamber. This enclosed mold is turned to rest on its long side 30 and the casting resin in liquid form is introduced into the inlet 31. The resin passes through the duct 32, and into the aperture 27 by means of a small opening 33, and is arranged to enter the aperture from the bottom so as to displace the air present. The resin fills up all space within the aperture, with any overflow leaving the mold through an opening 34. After the resin has set, the two parts 11 and 12 will be joined in one rigid assembly with the parts being held in their proper relationship by the hardened resin. The assembly may now be lifted from the mold.

The elastomer seal 21 is made slightly larger than the inner diameter of the enlarged portion 35 of part 12, so that it will be compressed elastically as the inner diameter is slid over it in placing part 12 on the mold member 15, and form a tight fit. The elastomer seal 22 is likewise made larger than the diameter of the aperture 27 into which it fits so that it is also compressed elastically by the aperture wall when the mold member 18 is placed into position in the main mold 25. This provides a tight sealing fit between the seal 22 and the aperture. By means of the two seals, the casting resin is contained within the aperture on being poured into the mold, and is unable to leak out or seep into other parts of the mold and thereby cause a removal problem.

Two collars 36 and 37 are provided on the part 11 which abut against shoulders 23 and 24 respectively to insure the assembly having correct axial positioning and length. The inner diameters of the two seals are slightly smaller than the collar diameters so as to form a tight sealing fit about the collars and prevent the casting resin from leaking out at these points into other parts of the mold assembly. Additional sealing effect is provided by the contact between the seal 22 and the pronglike surfaces 38 of part 12.

Since the basis of the invention lies in the action of the two seals, it is essential that they be made of suitable elastomer material. Examples of substances which are satisfactory for this purpose are rubber, silicones, or polyvinyl chloride. In practice the seals are usually placed on their respective mold members by casting, with the liquid elastomer being set by heating it to a temperature of approximately 90° C.

The material chosen for the casting resin is a thermosetting resin, typical examples of which are the polyester resins. What is desired is a resin that is capable of being poured and which does not require pressure in its setting. After the resin has hardened, it serves the dual purpose of holding the two parts of the coaxial assembly fixture in spaced relation with each other and of insulating the parts from each other.

In the embodiment of the invention here shown, the section 40 of assembly part 12 is punched to form four J-shaped projections 41 facing inwardly toward the molding chamber. When the part 12 with its auxiliary mold members 15 is placed into the main mold, it is turned so that one of the openings in the section 40, which was created when the J-shaped projections were formed, is placed adjacent to the small inlet 33 to allow the casting resin to enter the chamber.

Since all casting resins shrink to some extent on setting, it is always desirable to prevent this shrinkage from affecting the relative positions of the parts being joined. In the present case it is a necessity because of the need for maintaining the concentricity of the two assembly parts, and this is accomplished by means of the J-shaped projections 41 and the serrated collar 42 of assembly part 11. As the resin tends to shrink away from the inner surface of the section 40, it shrinks against and is held by the surfaces 43 of the J-shaped projections 41, thus preserving the concentricity of the molded assembly. In a like manner, lengthwise shrinkage is controlled by the collar 42 of part 11, as the resin will shrink with equalizing effect against the two opposite ends of this collar. The collar 42 has serrations which coact with the hardened resin to prevent torsional displacement.

The use of the seals described in the present invention aids in minimizing the cost of the molding process by eliminating the problem of resin leakage. Although described with regard to a particular use, the elastomer seals are of general application and may be used in any molding process where the molding material does not reach temperatures high enough to be injurious to the seal.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

In a molding device, a main mold, two auxiliary mold members which combine with the main mold to form a molding chamber, with said main mold having a passage for admitting a joining material into the bottom of the chamber, one of the auxiliary mold members having a central bore for receiving one of two parts to be joined in the chamber while the other member has a cylindrical portion which fits within the second of the parts to be joined, with the two members being positioned to hold the two parts in proper concentric and axial relation in the chamber, and a pair of sealing members of elastomer material mounted on the ends of the two auxiliary mold members adjacent to the chamber, said sealing members providing a seal for the chamber through elastic deformation of the elastomer material.

ERWIN E. FRANZ.

REFERENCES CITED

The following references are of record in the file of this patent:

UNITED STATES PATENTS

| Number | Name | Date |
|---|---|---|
| Re. 12,703 | Corcoran | Oct. 22, 1907 |
| 479,354 | Dickinson | July 19, 1892 |
| 1,997,074 | Novotny | Apr. 9, 1935 |
| 2,172,243 | Goodnow et al. | Sept. 5, 1939 |
| 2,203,543 | Pancorbo | June 4, 1940 |
| 2,368,717 | Marschner | Feb. 6, 1945 |
| 2,382,200 | Brunner | Aug. 14, 1945 |